United States Patent [19]
Haubs et al.

[11] Patent Number: 5,342,432
[45] Date of Patent: Aug. 30, 1994

[54] COMPOSITE MEMBRANE, PROCESS FOR ITS PRODUCTION AND ITS USE

[75] Inventors: Michael Haubs, Bad Kreuznach; Werner Prass, Mainz, both of Fed. Rep. of Germany

[73] Assignee: Hoechst Aktiengesellschaft, Frankfurt am Main, Fed. Rep. of Germany

[21] Appl. No.: 867,218

[22] PCT Filed: Nov. 26, 1990

[86] PCT No.: PCT/EP90/02021

§ 371 Date: Jul. 2, 1992

§ 102(e) Date: Jul. 2, 1992

[87] PCT Pub. No.: WO91/09669

PCT Pub. Date: Jul. 11, 1991

[30] Foreign Application Priority Data

Dec. 23, 1989 [DE] Fed. Rep. of Germany ....... 3942867
Feb. 27, 1990 [DE] Fed. Rep. of Germany ....... 4006139

[51] Int. Cl.$^5$ ............................................. B01D 53/22
[52] U.S. Cl. ........................................ 95/47; 95/51; 96/13
[58] Field of Search ...................... 55/16, 68, 158, 524; 95/45, 47, 51; 96/11–14

[56] References Cited

U.S. PATENT DOCUMENTS

| | | | |
|---|---|---|---|
| 3,874,986 | 4/1975 | Browall et al. | 161/160 |
| 3,892,665 | 7/1975 | Steigelmann et al. | 210/490 |
| 3,980,456 | 9/1976 | Browall | 55/158 |
| 4,581,043 | 4/1986 | van der Scheer | 55/158 X |
| 4,594,079 | 6/1986 | Yamamoto et al. | 55/158 |
| 4,602,922 | 7/1986 | Cabasso et al. | 55/158 |
| 4,631,075 | 12/1986 | Yamabe et al. | 55/158 |
| 4,746,333 | 5/1988 | Peinemann et al. | 55/158 |
| 4,758,342 | 7/1988 | Heckmann et al. | 55/158 X |
| 4,781,733 | 11/1988 | Babcock et al. | 55/158 X |
| 4,851,216 | 7/1989 | Lee | 55/158 X |
| 4,933,082 | 6/1990 | Yamada et al. | 55/158 X |
| 4,938,778 | 7/1990 | Ohyabu et al. | 55/158 |
| 4,963,165 | 10/1990 | Blume et al. | 55/158 X |
| 4,990,165 | 2/1991 | Bikson et al. | 55/158 |
| 5,002,590 | 3/1991 | Friesen et al. | 55/158 X |
| 5,011,518 | 4/1991 | Ogawa | 55/158 |
| 5,049,167 | 9/1991 | Castro et al. | 55/158 X |
| 5,085,776 | 2/1992 | Blume et al. | 55/158 X |
| 5,108,464 | 4/1992 | Friesen et al. | 55/158 X |

FOREIGN PATENT DOCUMENTS

| | | | |
|---|---|---|---|
| 0059393 | 9/1982 | European Pat. Off. | |
| 0134056 | 3/1985 | European Pat. Off. | |
| 0144054 | 6/1985 | European Pat. Off. | 55/158 |
| 3415624 | 10/1984 | Fed. Rep. of Germany | |
| 59-059210 | 4/1984 | Japan | 55/158 |
| 61-129008 | 6/1986 | Japan | 55/158 |
| 63-214319 | 9/1988 | Japan | 55/158 |
| 1-067209 | 3/1989 | Japan | 55/158 |

OTHER PUBLICATIONS

Separation Science and Technology, 15(4), pp. 1059–1068, 1980, "A Novel Approach to Gas Separations Using Composite Hollow Fiber Membranes", Jay, M. S. Henis and Mary K. Tripodi.

J. Am. Chem. Soc. 1987, 109, pp. 788–796, "Self-Organization of Polymeric Lipids with Hydrophilic Spac- (List continued on next page.)

*Primary Examiner*—Robert Spitzer
*Attorney, Agent, or Firm*—Curtis, Morris & Safford

[57] ABSTRACT

Composite membrane, process for its production and its use

A composite membrane for gas separation having a three-layer structure, constructed from A) a supporting membrane layer made of porous polymer,
B) a nonporous, gas-permeable intermediate layer,
C) a permselective layer of regularly arranged organic molecules having a layer thickness of 3 to 100 nm, the layers (A) and (C) enclosing the intermediate layer (B), wherein the permselective layer (C) is constructed from regularly arranged amphiphilic molecules which contain one or two alkyl chains each having 7 to 25 carbon atoms per polar hydrophilic group.

6 Claims, No Drawings

OTHER PUBLICATIONS ers in Side Groups and Main Chain: Investigation in Monolayers and Multilayers", A. Laschewsky, H. Ringsdorf, G. Schmidt and J. Schneider.

Journal of Membrane Science, 1 (1976) pp. 99–108, "Ultrathin Silicone/Polycarbonate Membranes for Gas Separation Processes", W. J. Ward III, W.R. Browall and R. M. Salemme.

2194 Thin Solid Films, 180 (1989) Nov. 21, No. 1, Lausanne, CH, pp. 241–248, "Gas Transfer in Supported Langmuir–Blodgett Films of Polymeric Lipids", P. Stroeve et al.

Journal of Colloid and Interface Science, vol. 27, No. 2, Jun. 1968, pp. 193–207, "Gas Transport Through Supported Langmuir–Blodgett Multilayers", G. D. Rose and J. A. Quinn.

COMPOSITE MEMBRANE, PROCESS FOR ITS PRODUCTION AND ITS USE

The present invention relates to a composite membrane constructed from three layers, which is highly suitable for the separation of gas mixtures and which contains a permselective layer of regularly arranged amphiphilic molecules.

In industry, the task is often faced of completely separating gas mixtures or at least concentrating one component of the gas mixture. This task is carried out to an increasing extent with the aid of semipermeable membranes. Depending on solubility and diffusion coefficients, these membranes allow gases to pass through at a variable rate.

A composite membrane for gas separation having a three-layer structure is already known from DE-OS 3,415,624. It contains a supporting membrane layer made of porous polymer (A), a nonporous, gas-permeable intermediate layer (B) made of polyorganosiloxane and a thin layer of a special polymer (C) which has a favorable $O_2/N_2$ permeability coefficient ratio (selectivity). This layer can be obtained by application of a thin film, which can be produced by spreading on a water surface.

For the industrial utility of such gas separation membranes, both their permeability and their selectivity are of particular importance.

The permeability of a membrane for a certain gas depends both on the thickness of the active layer (=permselective layer) and on the permeability coefficient for this gas. The gas permeability of the gas-permeable intermediate layer (B) is in general substantially greater than that of the permselective layer.

The separation selectivity of a membrane is primarily determined by the material of the layer (C). However, experience tells us that materials of high selectivity have a low permeation coefficient.

Therefore all attempts to find polymer materials for C which have both a high selectivity and a high permeability coefficient have hitherto been unsuccessful. The choice is therefore only between highly permeable and slightly selective or selective and slightly permeable membranes. The latter are preferably employed today for industrial applications.

In order to be able to obtain acceptable permeation rates, efforts have been made to make the thickness of the active layer (=permselective layer) as thin as possible. In this case, however, the occurrence of defects, so-called pinholes, sets limits on the efforts towards ever smaller layer thicknesses.

Thus, today it is possible to produce permselective layers having layer thicknesses of about 0.05 to 0.5 $\mu$m (=50-500 nm). The use of membranes having such layer thicknesses became possible after it had been learnt virtually to block the pinholes always occurring in such thin (permselective) layers with silicone rubber (Henis, J. M. S.; Tripodi, M. K.; Sep. Sci. Technol. 1980, 15, 1059).

The silicone layer can thus be applied to the membrane as an outer layer. It can also be enclosed, however, by the supporting membrane layer and the permselective layer (cf. DE-OS 3,415,624).

Nevertheless, especially with respect to their permeability, these known membranes are still in need of improvement. The aim therefore existed of providing a composite membrane suitable for gas separation which has a considerably improved permeability combined with good selectivity.

A composite membrane has now been found, wherein the permselective layer is composed of regularly arranged amphiphilic molecules which contain one or two alkyl groups each having 7-25 carbon atoms per polar hydrophilic group. The layer (A) of the composite membrane is a porous micro- or ultra-filter. The gas-permeable intermediate layer (B) should be composed of an amorphous polymer having a high gas permeability. Suitable polymers are, for example polymethylpentene, polysiloxane-polycarbonate block copolymers, polytrimethylsilylpropyne, EPDM rubber or chlorinated polyethylene.

The amphiphilic molecules of the permselective layer should be water-insoluble and should form stable monolayers on the water/air interface. Such monolayers are known, for example, from DE-OS 3,724,688. Amphiphilic molecules in each case contain a hydrophilic (polar) "head" and at least one hydrophobic (non-polar) radical, for example a long alkyl chain or perfluoroalkyl chain.

The amphiphilic molecules employed according to the invention can be both of low molecular weight and high molecular weight.

Examples of amphiphilic molecules having a molecular weight of at most 1000 which may be mentioned are dipalmitoyllecithin and stearic acid. An example of a high molecular weight amphiphile which may be mentioned is polyhexadecyl acrylate. Other amphiphilic polymers having long-chain alkyl groups are known, for example, from A. Laschewsky, H. Ringsdorf, G. Schmidt, J. Schneider, J. Am. Chem. Soc. 109 (1987), 788–796. This publication is herewith expressly referred to.

Preferably, the low molecular weight or monomeric amphiphilic molecules of the permselective layer contain one or two alkyl chains having 8 to 18, in particular 8 to 16, carbon atoms per (polar) hydrophilic group.

The hydrophobic part of the amphiphilic molecules should have a certain minimum length. It is preferred if the amphiphilic compound contains at least one ether, hydroxyl, carboxylic acid, carboxylic acid ester, amine, carboxamide, ammonium salt, sulfate, sulfonic acid, phosphoric acid, phosphonic acid, phosphonic acid ester, phosphonamide or phosphoramide group as a hydrophilic group in addition to the hydrophobic group or groups.

It is particularly preferred if the polar part of the amphiphilic compound is selected form the following groups

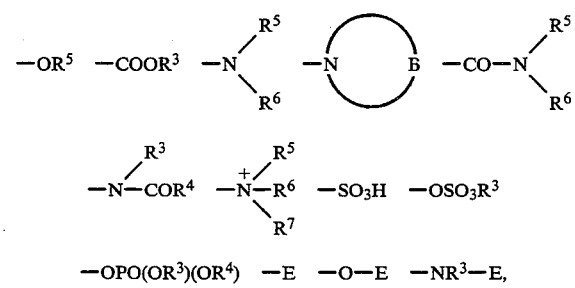

where $R^3$ to $R^7$, B and E are the following:

$R^3$ and $R^4$ are independently of one another H or $C_1$-$C_3$-alkyl, $R^5$, $R^6$ and $R^7$ are independently of one another H, $C_1$–$C_4$-alkyl, —$C_2H_4OH$ or —$CH_2$—CHOH—$CH_3$, in particular H or $CH_3$ is a divalent organic radical such that $$-N\underset{}{\underbrace{\phantom{OOO}}}B$$

forms a nitrogen-containing heterocycle, in particular a 5- or 6-membered, saturated or unsaturated heterocycle having 1 to 3 carbon atoms or nitrogen and oxygen atoms or nitrogen and sulfur atoms, and $$E \text{ is } -P(O)\diagdown\!\!\!\diagup\begin{array}{l}R^8\\ R^9\end{array} \text{ or } -P(O)\diagdown\!\!\!\diagup\begin{array}{l}R^8\\ OR^9,\end{array}$$

where $R^8$ and $R^9$ independently of one another are $$-N\diagdown\!\!\!\diagup\begin{array}{l}R^5\\ R^6\end{array}.$$

For example, the amphiphilic compound can be a fatty acid $CH_3(CH_2)_mCO_2H$, where m is a number from 8 to 25, preferably 12 to 22.

Suitable amphiphilic compounds are also unsaturated compounds of the formula I $$\begin{array}{c}H-(CH_2)_r\\ \diagdown\\ \diagup\\ H-(CH_2)_s\end{array}N-X-\underset{\underset{O}{\|}}{C}-\underset{R^1}{C}=CH-R^2 \quad (I)$$

in which
R$^1$ is H, Cl, F, CN or $(CH_2)_xH$
R$^2$ is H, $(CH_2)_uH$ or —CH=CH—$(CH_2)_uH$
X is a single bond, —$(CH_2)_y$Y—, —CO—$(CH_2)_y$—Y—, —$(CH_2CH_2O)_y$, —CO—$(CH_2)_y$—CO—Z or —CO— $(CH_2)_y$—O—$(CH_2CH_2$—O)$_v$—$(CH_2)_y$—CO—$(OCH_2CH_2)_t$—Y
Z is —O—$(CH_2$—$CH_2$—O—)$_w$
Y is O, NH or Z
r is a number from 7 to 21
s is a number from 0 to 24
x, y and t independently of one another are numbers from 1 to 10, and
u, v and w independently of one another are numbers from 0 to 10.

Suitable amphiphilic compounds are also homopolymers and copolymers which are prepared using the compounds I.

Particularly suitable compounds are additionally the following:

$$R^{10}\!\!\underset{R^{12}}{\overset{R^{11}}{-\!\!\!\bigcirc\!\!\!-}}\!\!-CH\!=\!N\!-\!NH\!-\!\bigcirc\!-NO_2 \quad (I)$$

in which
R$^{10}$ is the radical
$CH_3$—$(CH_2)_m$—S—, $CH_3$—$(CH_2)_m$—O—, $CH_3$—$(CH_2)_n$—C—O—[sic], O
$CH_3$—$(CH_2)_n$N$(CH_2)_i$H or
$CH_3$—$(CH_2)_n$(CO)N$(CH_2)_i$H,
R$^{11}$ and R$^{12}$ are independent of one another and independent of R$^{10}$ and can be —H, —OH or R$^{10}$ and
m is a number from 10 to 25, preferably 15 to 19,
n is a number from 8 to 22, preferably 10–14 and
i is a number from 0–25, preferably 0–18.

Since the preparation of the films is customarily carried out on water surfaces by means of the LB technique, amphiphilic compounds having only a low water solubility, in particular a water solubility of less than 5 g/l at 20° C., are preferred.

The composite membrane according to the invention can be produced by applying a permselective layer composed of organic material to a supporting membrane which is composed of a supporting membrane layer (A) made of porous polymer and a non-porous gas-permeable layer (B) made of an amorphous polymer. In this process, a water-insoluble amphiphilic compound is dissolved in an easily volatile organic solvent, the solution is spread on a water surface, and the resulting monomolecular film is compressed by the Langmuir-Blodgett technique and transferred to the immersed supporting membrane. Mixtures of amphiphilic compounds can also be used. Different amphiphiles can be employed in the individual, successively applied monomolecular films.

The supporting membrane employed can be prepared by coating a micro- or ultrafilter composed of polysulfone, polyimide, polyacrylonitrile, polyamide or polyether ketone with the amorphous polymers mentioned. The layer of the amorphous polymer should be nonporous and gas-permeable. The layer thickness is preferably 15 nm to 500 nm, preferably 30 to 250 nm, in particular 50 to 100 nm. Suitable polymers for the gas-permeable intermediate layer (B) are, for example, block copolymers of polysiloxane and polycarbonate or poly-4-methylpentene. The coating process is described in Ward, W. J. III, et al: J. Membr. Sci. 1976, 1, 99.

It is an advantage of the process according to the invention that several highly ordered and gas-selective layers can be applied successively to the supporting membrane by the Langmuir-Blodgett technique. The very thin layer can additionally be applied with a homogeneous thickness.

In order to separate or at least to concentrate gases with the aid of the composite membrane according to the invention, the gas to be separated is brought into a container which is closed by the composite membrane. The pressure in the container is higher than that outside the container. The permselective layer of amphiphilic molecules is preferably facing the elevated pressure side. On the outside at the lower pressure, a gas can be withdrawn in which one component of the two-component mixture is concentrated.

EXAMPLE 1

Gas-separating membrane of three-layer construction containing 4-hexadecyloxybenzaldehyde-4'-nitrophenylhydrazone as the active separating layer A 70×70 mm piece of a supporting membrane composed of a porous supporting membrane made of polypropylene (Celgard 2400), which has been coated with a 0.5 μm thick non-porous layer of polydimethylsiloxane-polycarbonate block copolymer, is coated with 4 monolayers of 4-hexa-decyloxybenzaldehyde-4'-nitrophenylhydrazone by the method of Langmuir and Blodgett. To do this, a piece of appropriate size is cut out of the supporting membrane and tensioned on a 70×90 mm polycarbonate frame. The membrane to be coated is rinsed with water under clean room conditions. Two hundred microliters of a solution of 6 mg of 4-hexadecyloxybenzaldehyde-4'-nitrophenylhydrazone in 5 ml of dichloromethane is poured (spread) onto the water surface of a commercial Langmuir film balance (film balance 2 from MGW Lauda) at a subphase temperature of 20° C. By reducing the size of the monofilm-covered water surface, the thrust is adjusted to 30 mN/m and kept constant at this value. The frame with the tensioned membrane is now immersed perpendicularly through the water surface in the film balance from above (immersion rate: 20 mm/min) and, after a short pause (10 sec.) at the lower turn-around point, taken out again (emersion rate: 10 mm/min). A monolayer is transferred to the support here both in the immersion and in the emersion procedure. After completion of the emersion procedure the residual monofilm is sucked off the water surface and a monofilm is spread again, as described above, and compressed to 30 mN/m, and two further monolayers are transferred to the supporting membrane by immersion and emersion. The transfer ratios are 90–100%.

The permeabilities of the three-layer membrane thus prepared were measured for various gases (nitrogen, oxygen and carbon dioxide). The following values for the permeabilities and selectivities resulted from the measurements:

Gas flow at 25° C.
$Nm^3/m^2 \cdot day \cdot bar [(cm^3 (STP)/cm^2 * sec * cm Hg)]$
$N_2$: 1.97 [$3.0 \times 10^{-5}$]
$O_2$: 4.73 [$7.2 \times 10^{-5}$]
$CO_2$: 27.6 [$4.2 \times 10^{-4}$]
Selectivity:
$O_2/N_2$: 2.4  $CO_2/N_2$: 14

Comparison Example

Gas-separating membrane of two-layer construction

A 70×70 mm piece of the supporting membrane from Example 1 is tested for gas permeability to nitrogen, oxygen and carbon dioxide. The following values resulted:

Gas flow at 25° C.
$Nm^3/m^2 \cdot day \cdot bar [(cm^3 (STP)/cm^2 * sec * cm Hg)]$
$N_2$: 17.7 [$2.7 \times 10^{-4}$]
$O_2$: 38.7 ]$5.9 \times 10^{-4}$]
$CO_2$: 197 [$3.0 \times 10^{-3}$]
Selectivity:
$O_2/N_2$:2.2  $CO_2/N_2$: 11

EXAMPLE 2

Gas-separating membrane of three-layer construction containing polyhexadecyl methacrylate as the active separating layer The supporting membrane was coated with 12 monolayers of polyhexadecyl methacrylate according to Example 1. The transfer conditions in this case are:
Subphase temperature: 30° C.
Thrust: 10 mN/m
Immersion rate: 20 mm/min
Emersion rate: 20 mm/min
Transfer ratio
   a) on immersion: about 40%
   b) on emersion: 90–100%

The permeability of the membranes thus prepared is measured for the gases oxygen, nitrogen, carbon dioxide and helium as in Example 1. In this case, the following results are obtained:

Gas flow at 25° C.
$Nm^3/m^2 \cdot day \cdot bar [(cm^3 (STP)/cm^2 * sec * cm Hg)]$
$N_2$: 1.31 [$2.0 \times 10^{-5}$]
$O_2$: 3.74 [$5.7 \times 10^{-5}$]
$CO_2$: 19.7 [$3 \times 10^{-4}$];
He: 18.4 [$2.8 \times 10^{-4}$]
Selectivity:
$O_2/N_2$: 2.85  $CO_2/N_2$: 14.8
$He/N_2$: 14

EXAMPLE 3

The membrane of Example 1 has a stream of air applied to the layer (C), while in [sic] vacuum is applied to the permeate side (layer A). The oxygen content of the gas mixture aspirated by the vacuum pump is examined and compared with the pressure on the vacuum side. No concentration (20% $O_2$) is found at 1000 mbar. The $O_2$ content is 28% at 500 mbar, 33% at 250 mbar and about 37% by volume at 5 mbar.

I claim:

1. A composite membrane for gas separation having a three-layer structure, constructed from
   A) a supporting membrane layer made of porous polymer,
   B) a nonporous, gas-permeable intermediate layer made of an amorphous polymer having a high gas permeability,
   C) a permselective layer of regularly arranged organic molecules having a layer thickness of 3 to 100 nm,
the layers (A) and (C) enclosing the intermediate layer (B), wherein the permselective layer (C) is constructed from regularly arranged polymeric amphiphilic molecules which contain one or two alkyl chains each having 7 to 25 carbon atoms per polar hydrophilic group and have a molecular weight of more than 5000.

2. The composite membrane as claimed in claim 1, wherein the permselective layer (C) is composed of at least two monomolecular layers of amphiphilic molecules arranged one above the other.

3. A process for the production of a composite membrane as claimed in claim 1, in which a permselective layer (C) made of organic material is applied to a supporting membrane which is composed of a supporting membrane layer (A) made of porous polymer and a nonporous, gas-permeable layer (B) made of an amorphous polymer having a high gas permeability, wherein a water-insoluble polymeric, amphiphilic compound which contains one or two alkyl chains each having 7–20 carbon atoms per polar hydrophilic group in the molecule and has a molecular weight of more than 5000 is dissolved in an easily volatile organic solvent, the solution is spread on a water surface, and the resulting film is compressed by the Langmuir-Blodgett technique and transferred to the immersed supporting membrane as a monomolecular permselective layer.

4. The process as claimed in claim 3, wherein the monomolecular permselective layer is applied to the gas-permeable layer (B) of the supporting membrane.

5. A process for separating a gas mixture into concentrated components, in which the gas mixture is brought into a container which is closed by a gas-separating membrane having a permselective outer coating facing the gas mixture, a lower pressure than in the interior of the container is maintained on the other side of the gas-separating membrane and a concentrated component of the gas mixture is withdrawn, wherein the composite membrane as claimed in claim 1 is employed as the gas-separating membrane.

6. The process as claimed in claim 5, wherein a gas mixture composed of nitrogen and oxygen is separated.

* * * * *